US005740945A

United States Patent [19]

Shipway

[11] Patent Number: 5,740,945

[45] Date of Patent: Apr. 21, 1998

[54] METHOD AND APPARATUS FOR STERILE DISPENSING OF PRODUCT

[75] Inventor: Malcolm Shipway, Bristol, United Kingdom

[73] Assignee: David S. Smith Packaging Limited, United Kingdom

[21] Appl. No.: 513,936

[22] PCT Filed: Mar. 1, 1994

[86] PCT No.: PCT/GB94/00398

§ 371 Date: Feb. 1, 1996

§ 102(e) Date: Feb. 1, 1996

[87] PCT Pub. No.: WO94/20406

PCT Pub. Date: Sep. 15, 1994

[30] Foreign Application Priority Data

Mar. 1, 1993 [GB] United Kingdom .................... 9304052

[51] Int. Cl.$^{6}$ ........................................ G01F 11/00

[52] U.S. Cl. .................................. 222/1; 222/83; 222/92; 222/148; 222/509

[58] Field of Search ................................ 222/1, 81, 82, 222/83, 92, 148, 509

[56] References Cited

U.S. PATENT DOCUMENTS

| | | | |
|---|---|---|---|
| 4,273,263 | 6/1981 | Voegele | 222/148 |
| 4,757,916 | 7/1988 | Goncalves | 222/83 |
| 5,099,805 | 3/1992 | Loeliger | 141/89 |
| 5,226,565 | 7/1993 | Hladis et al. | 222/148 X |
| 5,407,099 | 4/1995 | Heucke et al. | 222/83 |
| 5,447,254 | 9/1995 | Hoover et al. | 200/148 X |
| 5,479,955 | 1/1996 | Roodvoets et al. | 222/148 X |

FOREIGN PATENT DOCUMENTS

| | | |
|---|---|---|
| 0 072 699 | 8/1982 | European Pat. Off. . |
| 0 395 933 | 4/1990 | European Pat. Off. . |
| 2659074 | 2/1991 | France . |
| 1182088 | 9/1968 | United Kingdom . |

*Primary Examiner*—Joseph Kaufman

*Attorney, Agent, or Firm*—Blakely Sokoloff Taylor & Zafman

[57] ABSTRACT

A method and apparatus for sterile dispensing of product from an aseptic source is described. There is provided a valve device adapted for mounting at the outlet of the source, mounting the valve device on the outlet, providing sterilizing medium and sterilizing the outlet and valve with the medium prior to dispensing the product. There is provided a sterilizing chamber between a valve member and the valve device for continuously sterilizing part of the valve member in the chamber while product delivery occurs to create an aseptic barrier between the product and the environment.

8 Claims, 2 Drawing Sheets

METHOD AND APPARATUS FOR STERILE DISPENSING OF PRODUCT

BACKGROUND OF THE INVENTION

1. Field of the Invention

The invention relates to a dispensing method and apparatus, particularly to such a method and apparatus for sterile dispensing of product from an aseptic source thereof.

2. Art Background

Such aseptic sources are often packages of food or liquor such as a "bag-in-box" system for wine. The interior of the package and hence the wine is sterilized as is the interior of a membrane sealing an outlet from the package, and which membrane is pierced from the exterior to dispense wine. The problem is that the external surface of the membrane is often not sterilized, so that there is risk of contamination of product when the membrane is pierced from the exterior. EP-A-0 395 933 and GB 1 182 088A are both examples of documents which show prior art apparatus and dispensing methods.

It is accordingly an object of the invention to seek to mitigate this disadvantage.

SUMMARY OF THE INVENTION

According to a first aspect of the invention there is provided a method for sterile dispensing of product from an aseptic source thereof, comprising the steps of providing a valve device adapted for mounting on an outlet of the source, mounting the valve device at the outlet, providing sterilizing medium, and sterilizing the outlet and valve with the medium prior to dispensing product, characterised in that the valve is continuously sterilized whilst dispensing of product takes place.

This outlet may comprise a pierceable membrane, and the step of sterilizing same may comprise passing steam over an external, in relation to the product, surface of the membrane.

The method may include the step of sterilizing a flow passage from the valve to a product destination with the steam.

The method may comprise ceasing sterilization, piercing the membrane with membrane piercing means, and then passing product to the product destination.

The method may include the step of disconnecting the source and valve, providing a further aseptic source of product similar to the first source connecting the valve and outlet of the second source, and sterilizing the outlet and valve prior to passing product to the product destination.

There may be the step of monitoring the temperature and/or time of sterilization of an outlet and valve. This is for control of the method.

According to a second aspect of the invention there is provided apparatus for sterile dispensing of product from an aseptic source thereof, comprising a valve and a source of sterilizing medium, the arrangement being that the valve, a mounting thereof by which it is adapted to cooperate with the source, and an outlet from the source, are sterilized by the sterilizing medium when the valve and source are mounted one with the other, characterized in that the apparatus includes a sterilizing chamber adapted for sterilization of the valve member whilst product delivery takes place.

BRIEF DESCRIPTION OF THE DRAWINGS

A method and apparatus embodying the invention are hereinafter described, by way of example, with reference to the accompanying drawings.

DETAILED DESCRIPTION OF THE PREFERRED EMBODIMENTS

Figure 1:
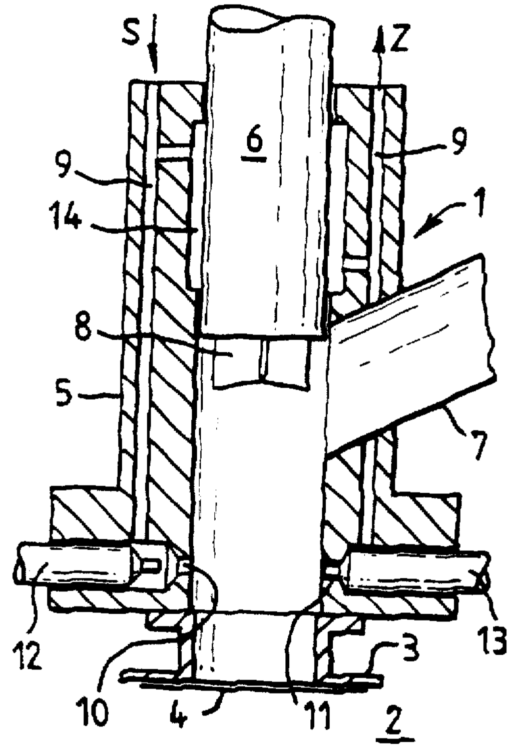
FIG. 1 shows schematically a longitudinal sectional view of a first step using a method and apparatus according to the invention.

Referring to the drawings, there is shown apparatus 1 for aseptic dispensing of product in a package 2 which has an outlet gland or boss 3, which outlet gland is at least initially closed by a pierceable plastic sheet or membrane 4. The interior of the package 2, and hence of the membrane 4, is aseptic. However, the exterior surface of the membrane 4, and the outlet gland 3 may not be aseptic.

In order to dispense product to a product destination or filling source, there is a valve device 5 which has a reciprocable valve member 6 which depending on its position opens or closes a flow passage 7 for product to the product destination. To do this, the membrane 4 must be broken or pierced for which purpose the valve member 6 carries at its forward end a piercer or knife 8. The valve 5 also has various passages 9 which are connected with a source (not shown) of sterilizing medium such as steam. These passages 9 are arranged both to sterilize the valve member 6 itself, and the outlet 3 of the package, the membrane 4 and a knife 8. There are outlets 10, 11 from the passages 9 which are each openable and closable by a respective piston member 12, 13, having a plug nose to plug the respective outlets 10, 11.

In a method embodying the invention, the valve 5, which is in the embodiment portable, is mounted on the outlet gland 3 of the package 2, the valve member 6 being withdrawn (as shown in FIG. 1). The passage or product line 7 from the valve 5 is connected to the product destination (filling source) or to a barrier valve system (not shown).

Figure 2:
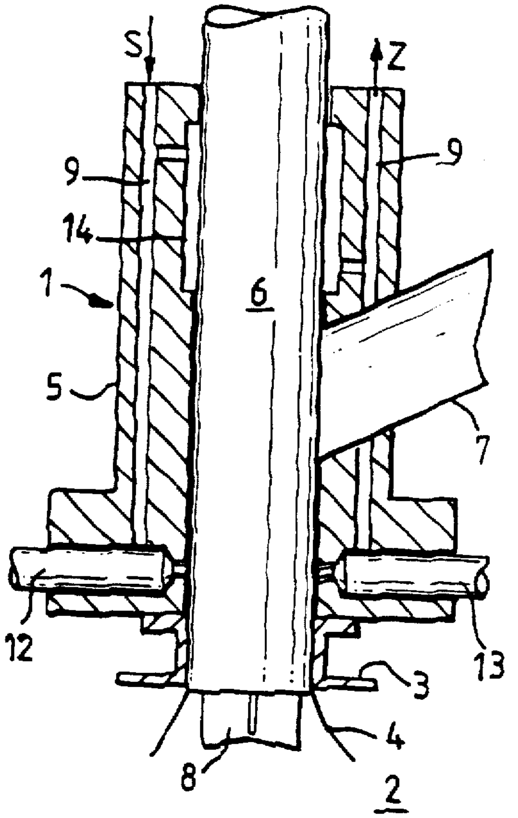
FIG. 2 shows a second step in the method.
Figure 3:
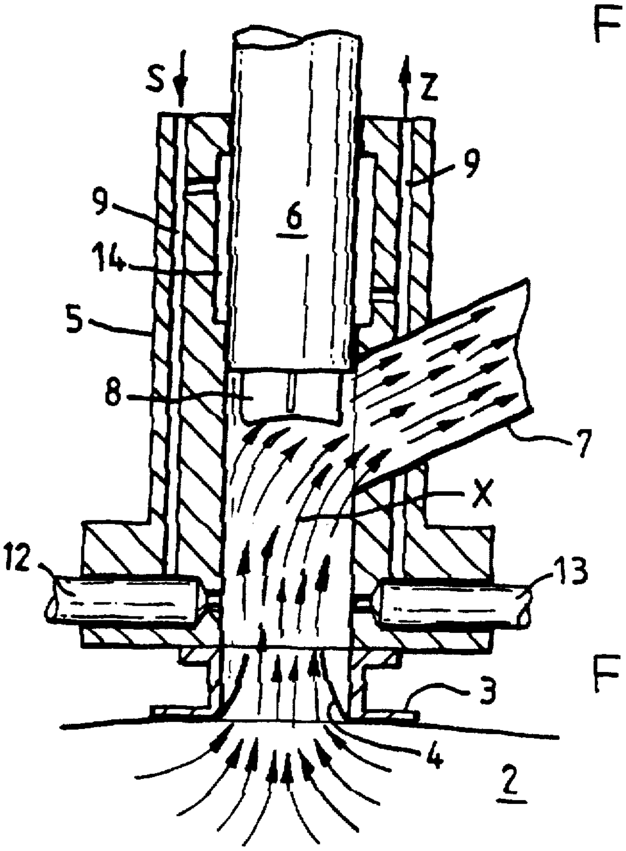
FIG. 3 shows a third step in the method.
Figure 4:
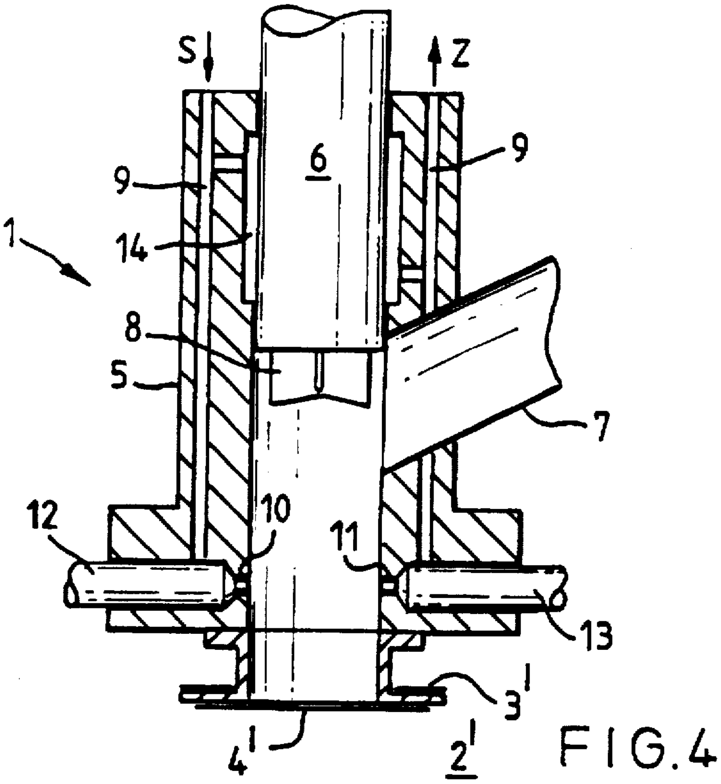
FIG. 4 shows a fourth step.
Figure 5:
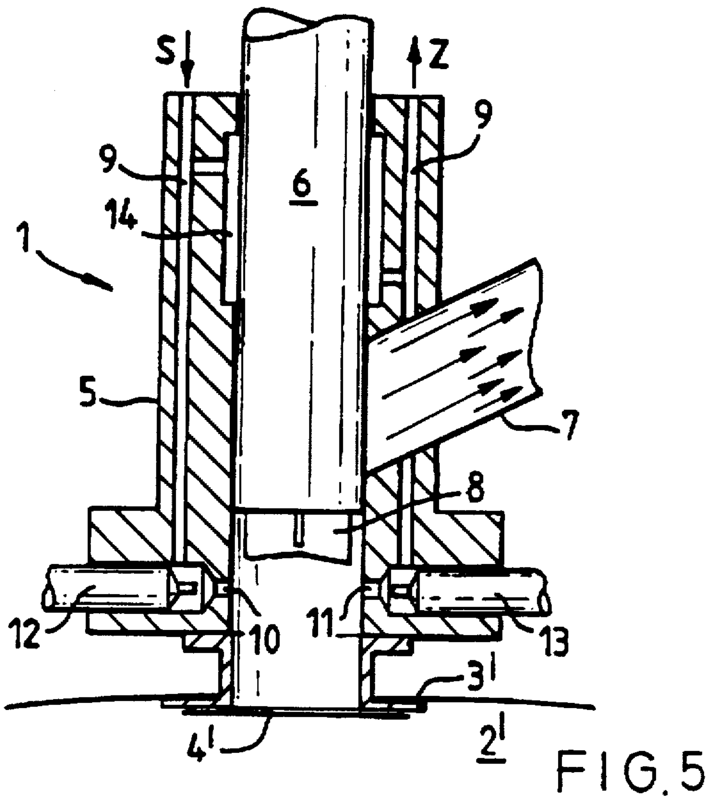
FIG. 5 shows a further step a method of sterilized delivery of product.

Assuming the apparatus described is part of a filling system which is electronically controlled and which system has a control panel or module, a sterilization mode can be selected. On such selection, steam passes from a source thereof through the valve passages 9 in direction 'S' into the product line 7, round the valve member 6 including the knife 8, and across the outlet gland 3 exterior surfaces and across the outer surface of the membrane 4. Steam exits in the direction 'Z'. There is a temperature and/or time monitoring system during sterilization and an alarm device for detecting failure of sterilization. Assuming that sterilization is completed satisfactorily, the valve 5 is actuated to move the valve member 6 forward (downwardly in FIG. 1) so that the knife 8 pierces the membrane 4, which is now sterile on its outer surface too and remains so as the knife 8 and outer surface of the valve member 6 is also sterile, the upper part of the valve member 6 being rendered sterile as steam continues to be passed into a chamber 14 so that the product line 7 remains sterile too as it is only exposed to a sterile or aseptic valve member. Steam is at this juncture, however, not passed to the outlet gland by closing the outlets 10, 11 by moving the pistons 12, 13 forward. All this is shown in FIG. 2. After piercing, the valve member 6 is withdrawn (FIG. 3) so that product can flow from the package 2 through the outlet gland 3, through the valve 5 and into the product line 7. It remains aseptic because all the surfaces it comes into contact with were previously sterilized. Product flow is shown by arrows 'X', FIG. 3. On completion of passage of a desired amount of product from the package, or an emptying of same, the valve 5 is closed and disconnected from the package 2. A new package 2' can then be connected immediately (FIG. 4) and then, with the valve member 6 shutting off the product line 7 and with the pistons open 12, 13, steam is admitted to render its gland outlet 3', gland and membrane 4' (FIG. 5) aseptic. The piston 13 is open to allow passage of steam across the members mentioned. On completion of sterilization, both pistons 12, 13 are actuated to close the outlets 10, 11, and the valve member 6 is operated to pierce the membrane 4', and is then withdrawn to open the product line once more to flow of product from the second package 2'. This operation can therefore be repeated with as many packages as desired, and in each instance the whole of the exterior is rendered aseptic so that in each case the aseptic contents remain so as they pass through an aseptic dispensing environment.

A full cleaning in place of a system using the apparatus and method can be carried out at the end of the method. It will also be understood that a full sterilization of the complete system will be carried out at the commencement of the method and that alarms or safety features are built into the system so that the method will not be operative without satisfactory initial sterilization (FIG. 1) and sterilization of subsequent packages (intermediate sterilization).

I claim:

1. A method for sterile dispensing of product from an aseptic source thereof, comprising the steps of providing a valve device having a reciprocable valve member and being adapted for mounting on an outlet of the source, mounting the valve device at the outlet, providing sterilizing medium, and sterilizing the outlet and valve member with the medium prior to dispensing product including the step of providing a sterilizing chamber between the valve member and valve device and continuously sterilizing part of the valve member in the chamber whilst product delivery occurs to create an aseptic barrier between the product and the environment.

2. A method according to claim 1, wherein the sterilizing medium comprises steam.

3. A method according to claim 2, wherein the outlet comprising a pierceable membrane, the step of sterilizing same including passing steam over an external, in relation to the product, surface of the membrane.

4. A method according to claim 3, including the step of sterilizing a flow passage from the valve to a product destination with the steam.

5. A method according to claim 4, comprising ceasing sterilization of the flow passage, piercing the membrane with membrane piercing means, and then passing product to the product destination.

6. A method according to any preceding claim, including the step of disconnecting the source and valve, by providing a further aseptic source of product similar to the first source, connecting the valve and outlet of the second source, and by sterilizing the outlet and valve prior to passing product to the product destination.

7. A method according to claim 1 including the step of monitoring the at least one of temperature and time of sterilization of an outlet and valve.

8. Apparatus for sterile dispensing of product from an aseptic source thereof, comprising a valve and a source of sterilizing medium, the arrangement being that the valve, a mounting thereof by which it is adapted to cooperate with the source, and an outlet from the source, are sterilized by the sterilizing medium when the valve and source are mounted one with the other wherein the apparatus includes a sterilizing chamber in the valve disposed to allow continuous sterilization of a part of a valve member whilst product delivery takes place.

* * * * *